INVENTOR.
Robert F. Smith
BY Herbert Furman
ATTORNEY

Oct. 12, 1965   R. F. SMITH   3,211,279
CONVEYOR SYSTEM
Filed Aug. 3, 1962   4 Sheets-Sheet 3

INVENTOR.
Robert F. Smith
BY
Herbert Furman
ATTORNEY

INVENTOR.
Robert F. Smith
BY Herbert Furman
ATTORNEY

United States Patent Office 3,211,279
Patented Oct. 12, 1965

3,211,279
CONVEYOR SYSTEM
Robert F. Smith, Grosse Pointe Woods, Mich., assignor to General Motors Corporation, Detroit, Mich., a corporation of Delaware
Filed Aug. 3, 1962, Ser. No. 214,628
4 Claims. (Cl. 198—203)

This invention relates to conveyor systems and more particularly to conveyor systems of the friction drive type.

The conveyor system of this invention generally includes a plurality of belt segments located in spaced successive relationship and connected to a plurality of members guided for movement in the desired path of travel and adapted to be secured to the articles to be moved or carried by the conveyor system. A plurality of gripping means are spaced around the path of travel of the conveyor system and grip the belt segments from each side thereof so as to move the segments past the gripipng means at the desired rate. Each gripping means generally comprises a pair of continuous oppositely driven driver belts which frictionally grip the belt segment therebetween and move the belt segment along the path of travel at the desired speed. The spaced pairs of driver belts are driven at the same speed so that the entire system moves at the desired speed without slack or binding between the guided members or belt segments.

The primary object of this invention is to provide a new and improved conveyor system. Another object of this system is to provide a new and improved conveyor system of the friction drive type. A further object of this invention is to provide a new and improved conveyor system which includes a plurality of interconnected belt segments and driving means adapted to frictionally grip the belt segments and move them at the desired rate of travel. Yet another object of this invention is to provide a new and improved conveyor system which includes guided members guided for movement along a desired path of travel and translated by means of a plurality of spaced belt segments operatively secured thereto and moved by means of belt driving means frictionally engaging opposite sides of the belt segments. Yet a further object of this invention is to provide an improved conveyor system which includes a continuous driven loop means having means for easily adjusting the tension in the loop means and which further includes driver belt means adapted to frictionally grip driven belt segments of the driven loop means to move the driven loop means along a path of travel at the desired speed.

These and other objects of the invention will be readily apparent from the following specification and drawings wherein.

Figure 1:
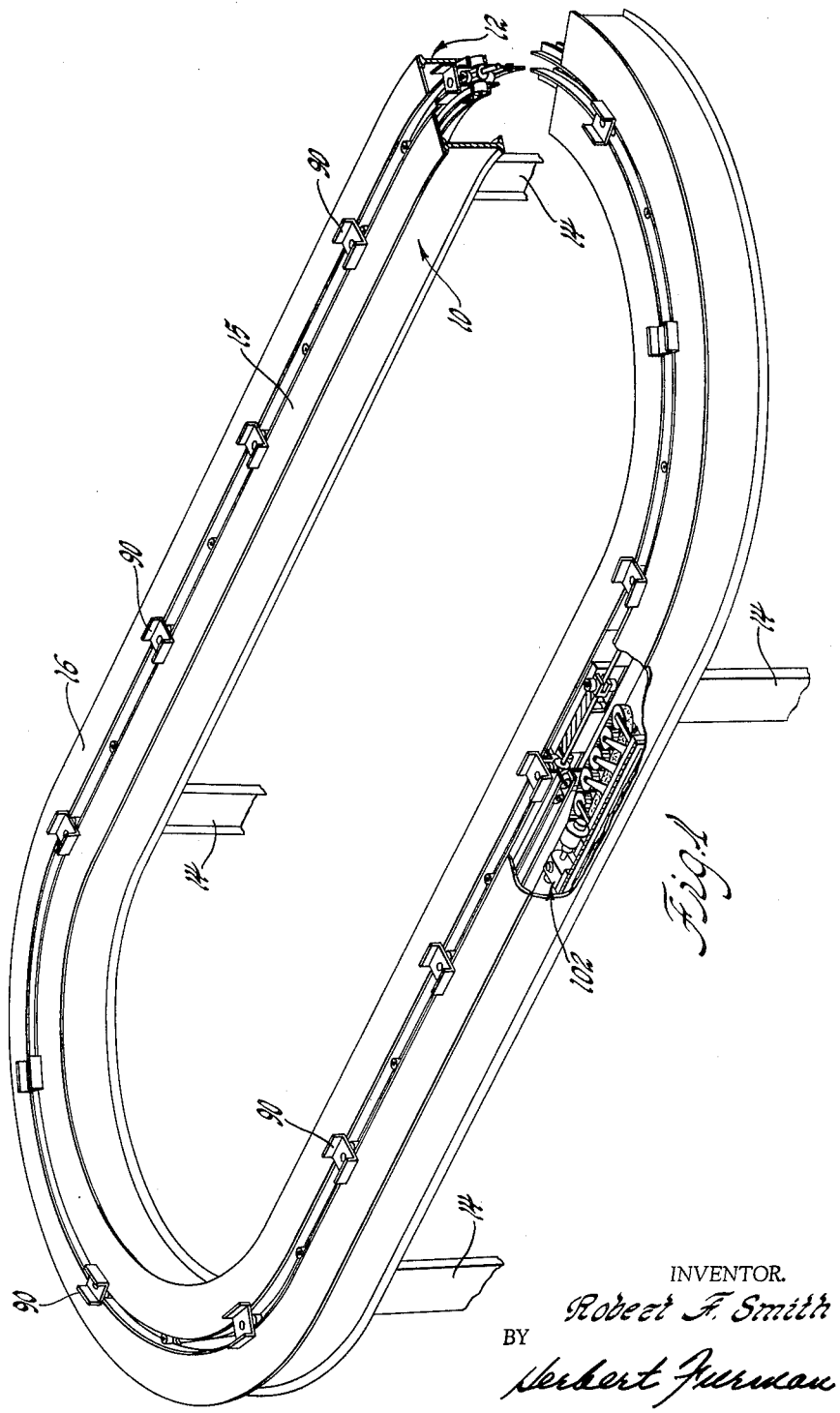
FIGURE 1 is a partially broken away perspective view of a conveyor system according to this invention.

Referring now to FIGURE 1 of the drawings, the conveyor system generally comprises a pair of continuous support members or I beams 10 and 12 supported in a conventional manner on the floor or horizontal by depending support structures 14 having their upper ends welded to respective I beams and their lower ends fixedly secured to the floor or horizontal. A pair of continuous metal plate members 15 and 16 have their remote edge portions resting upon and secured to the members 10 and 12, respectively. The adjacent ends of the members 15 and 16 are secured to one leg of continuous angle iron members 18 and 20 respectively, FIGURES 2 and 3, which are spaced from like oppositely disposed members 22 and 24 respectively. The members 10 and 12, 15 and 16, 18 and 20, and 22 and 24 are generally shaped to the desired path of travel of the conveyor system, and it will be noted that the path of travel is generally a closed loop having portions thereof at varying distances to the horizontal. The vertically disposed flanges or legs of members 18 and 20 and of members 22 and 24 define the horizontal guides or guiding means 26 of the conveyor system, and the horizontally disposed flanges or legs of members 18 and 20 and of members 22 and 24 define the vertical guides or guiding means 28 of the conveyor system. These members and the guides or guiding means defined thereby are traversed by a plurality of pivotally interconnected guided members or bogies 30 which will now be described with particular reference to FIGURES 2, 3, 6 and 7 of the drawings.

Figure 3:
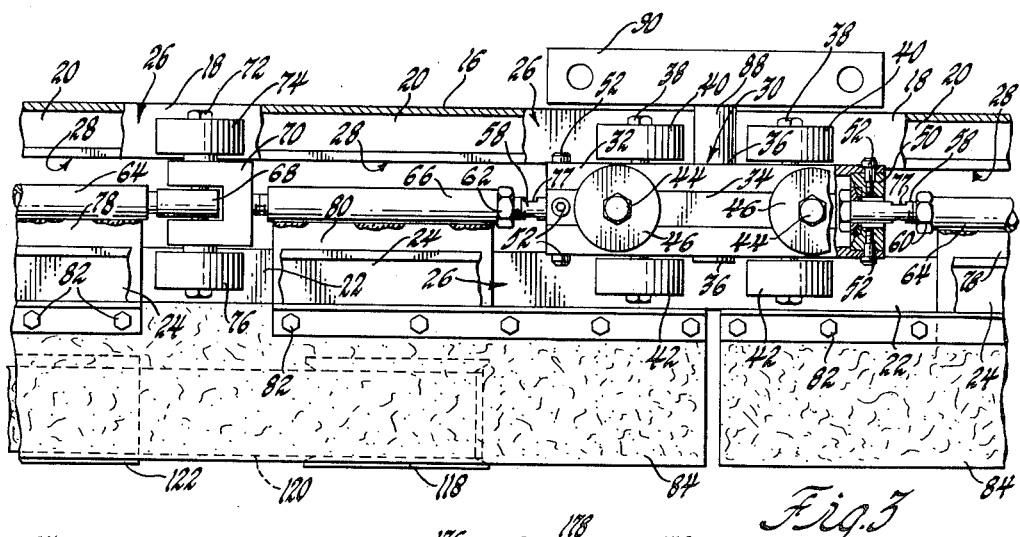
FIGURE 3 is a broken away sectional view taken generally along the plane indicated by line 3—3 of FIGURE 2.
Figure 7:
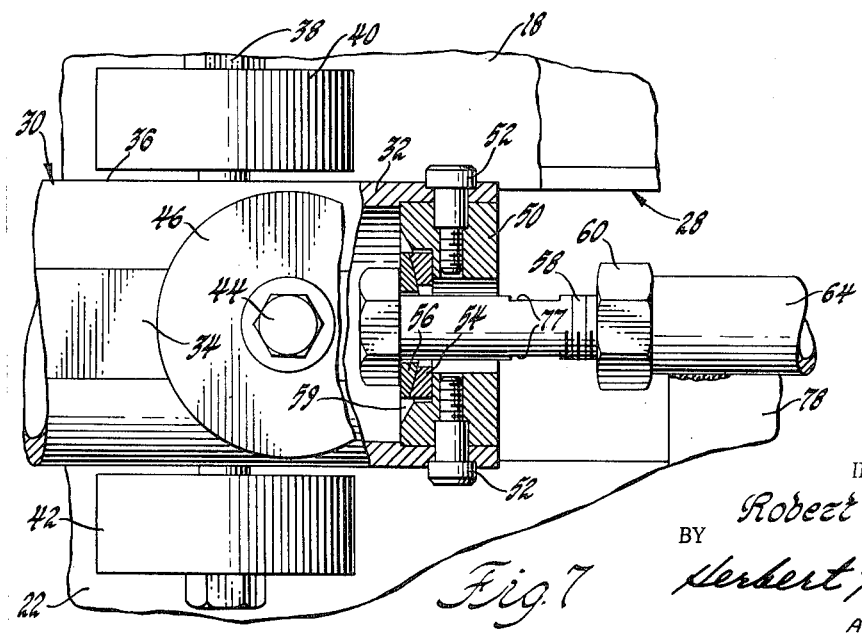
FIGURE 7 is an enlarged view of a portion of FIGURE 3.

Each bogie includes a hollow tubular body member 32 having oppositely disposed flat sides 34 and 36. Spaced shafts 38 extending through spaced pairs of aligned apertures in the sides 36 rotatably support respective pairs of guide rollers 40 and 42 which are received in the horizontal guiding means 26 so as to guide horizontal movement of the bogie: A like pair of spaced shafts 44 extending through spaced pairs of aligned apertures in the sides 34 rotatably support pairs of guide rollers 46 and 48 which are received within the vertical guiding means so as to guide vertical movement of the bogie. Thus, each bogie 30 is guided for both horizontal and vetrical movement along the desired path of travel of the conveyor system. An apertured end plate 50 is received within each shouldered end of member 32 and bolted thereto at 52. A pair of washers 54 and 56 have respective concave and convex mating surfaces, with washer 54 seating within a counterbore of the end plate 50. A bolt 58 has its head seating on the washer 56 and projects outwardly through the apertures in the washers 54 and 56 and also through the aperture of the end plate 50. It will be noted that the end plate 50 is cut away at 59 adjacent the counterbore receiving the washer 54 so as to allow for sliding movement of the washer 56 and bolt 58 relative to the washer 54 and the end plate 50. The aperture of the washer 54 is enlarged to provide for this sliding movement. Thus, the bolt 58 can pivot in all directions relative to the bogie 30. The bolts 58 are threadedly received within internally threaded sleeves or tubular members 64 and 66 respectively, each being located to one side of the bogie 30, as shown in FIGURE 3, and are adjustably fixed by respective lock nuts 60 and 62 engaging the ends of a respective sleeve 64 or 66. The other end of the member 64 is fixedly secured to a circular member 68 which is received between the legs of a clevis member 70 which is secured to the other end of the member 66. Members 68 and 70 are pivotally secured together by shaft 72 which also rotatably mounts a vertically disposed pair of guide rollers 74 and 76 received within the horizontal guiding means 26 of the conveyor system in spaced relationship to the pairs of rollers 40 and 42. Thus, the bogies 30 can swing relative to each other about the shafts 72. As best shown in FIGURE 7, bolts 58 include flats 77 so that the tension in the driven loop means, which includes the bogies 30, the sleeves 64 and 66, the members 68 and 70 and the driven belt segments, may be easily adjusted. To adjust the tension, one or more of the nuts 60 or 62 are backed away from the ends of a respective sleeve 64 or 66, and a wrench is placed on the flats 77 to adjust one or more of the bolts 58. The nuts 60 or 62 are then retightened.

Plate members 78 and 80 are secured to the sleeves 64 and 66 respectively and depend therefrom. The adjacent plate members 78 and 80 on successive bogies 30 have their lower ends bolted at 82 to a belt segment 84 and to a pair of reinforcing strips 86. It will be noted that no reinforcing strip is provided below the guide rollers 74 and 76 since the belt segments 84 must flex or bend in this area if successive bogies swing or pivot relative to each other about shaft 72. Each bogie is secured to the articles or members to be transported by means of a vertically disposed shaft 88 which is fixedly secured to the member 32 intermediate the pairs of rollers 40 and 42 and has its upper end secured to a bracket member 90 which in turn is to be secured to the articles or members to be transported. It will be understood that other means of securing the bogies to the articles or members to be transported could be provided, and that successive bogies may or may not be secured to the members or articles to be transported as desired.

Figure 2:
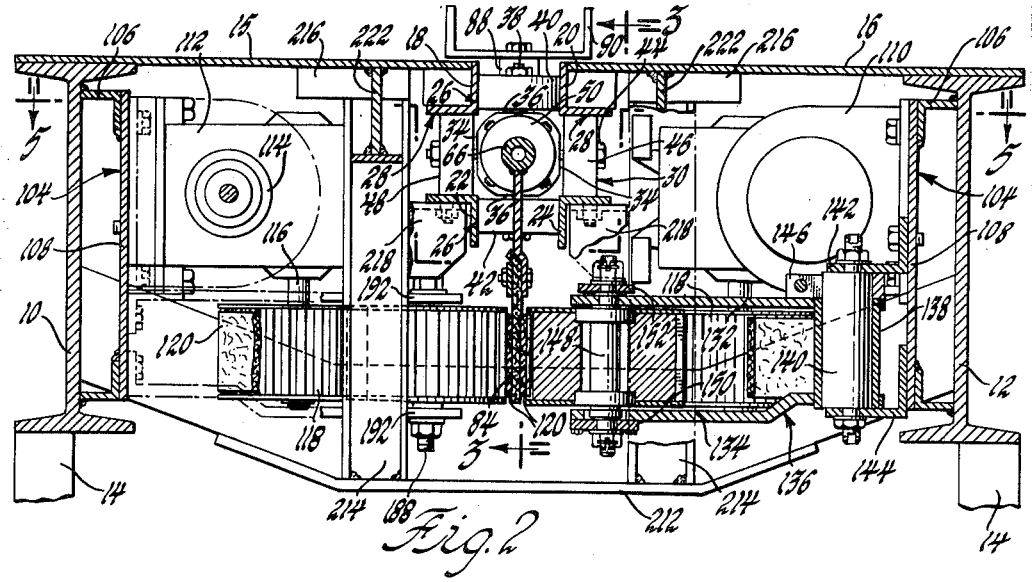
FIGURE 2 is an enlarged partially broken away sectional view taken generally along the plane indicated by line 2—2 of FIGURE 5.

Referring now particularly to FIGURES 1, 2, 4 and 6 of the drawings, the driving units for the belt segments 84 will be described. The drive units, generally designated as 100 and 102, are generally of the same construction except for certain details as hereinafter pointed out. Each driving unit is generally mounted on its respective beam 10 and 12 by a mounting base 104 which comprises a rectangular frame 106 of angle iron covered with a plate 108. The drive motors 110 of the units are bolted to the plate 108 and drive conventional reduction gear units 112, which are also bolted to the plate 108, through flexible couplings 114. As shown in FIGURE 2, the output shaft 116 of the reduction gear unit 112 has fixed thereto a toothed drive pulley 118 which drives a toothed continuous drive belt 120. Each drive unit further includes a belt positioning pulley 122, three like driven pulleys 124 which press the driven belts 120 against the belt segments 84, and a belt tensioning pulley 126. The pulleys 122 and 126 position the belts 120 with respect to the pulleys 124 and the belt segments 84 and the pulleys 126 are further adjustable to adjust the tension in the drive belts.

Figure 4:
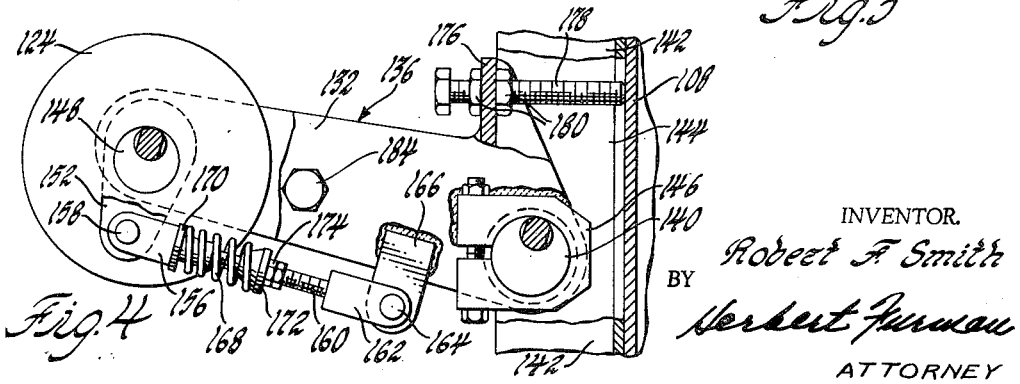
FIGURE 4 is an enlraged partially broken away view of a portion of FIGURE 5.
Figure 5:
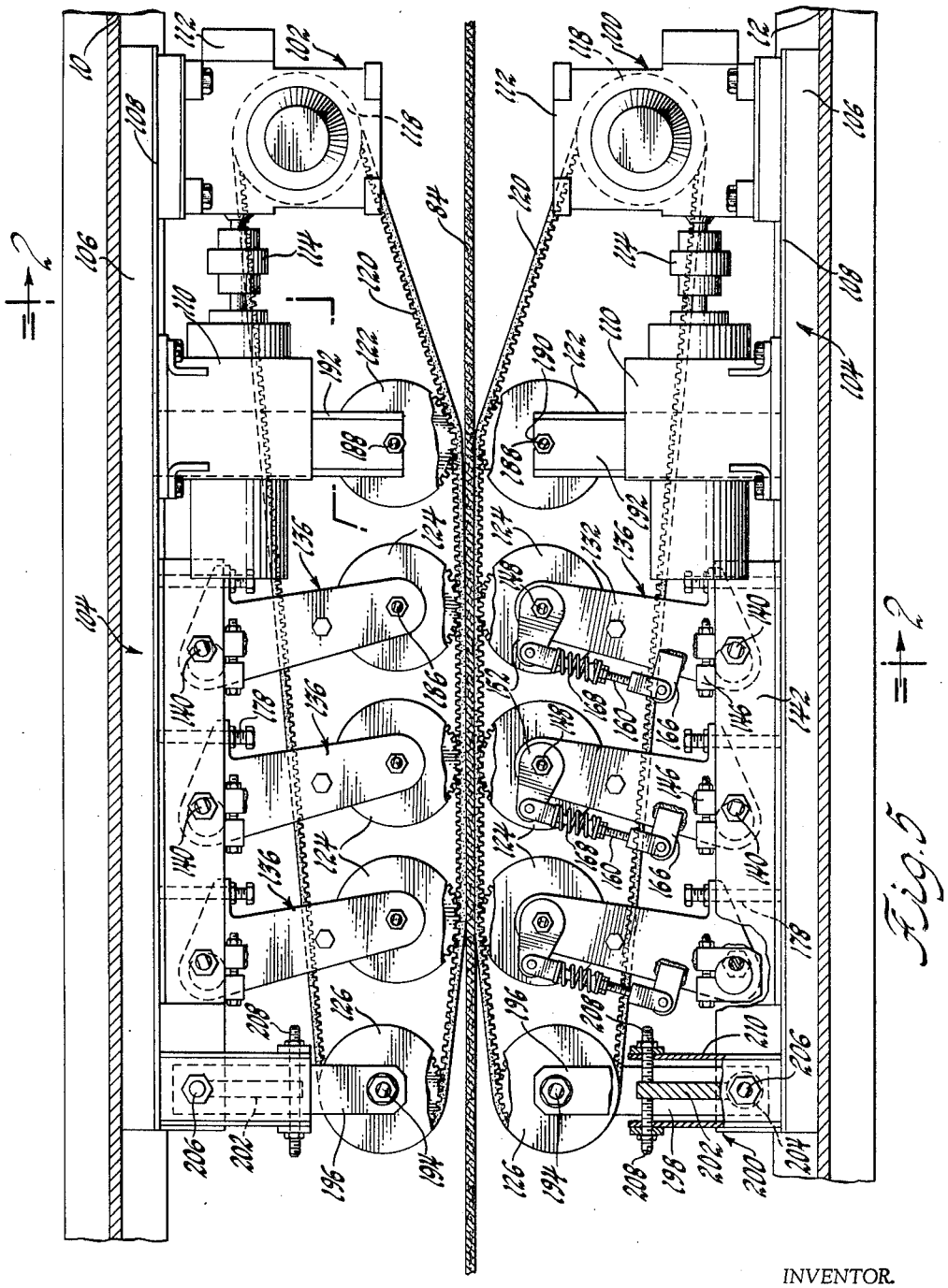
FIGURE 5 is an enlarged partially broken away sectional view taken generally along the plane indicated by line 5—5 of FIGURE 2.
Figure 6:
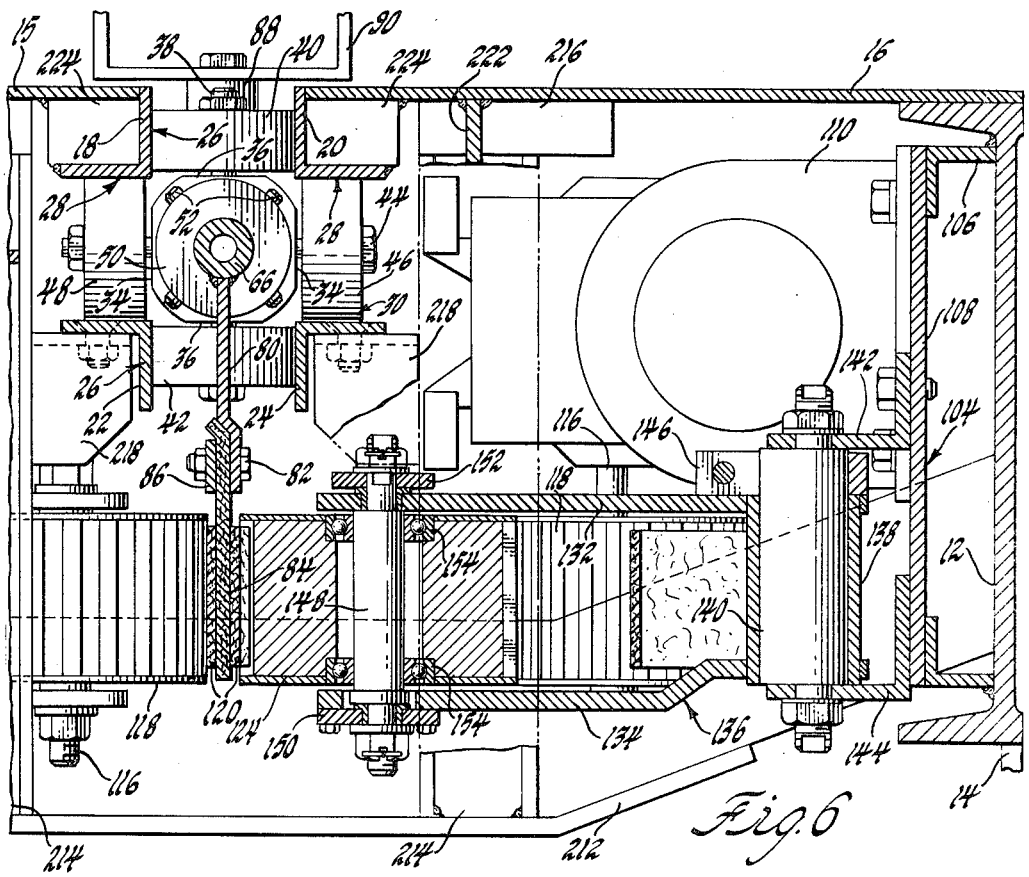
FIGURE 6 is an enlarged view of a portion of FIGURE 2.

The pulleys 124 of unit 100 are of like construction and each is supported between upper and lower members 132 and 134 of a support assembly 136, FIGURES 4 and 6. Members 132 and 134 are generally of L shape and are apertured adjacent the juncture of the legs thereof so as to receive and be secured to a sleeve 138 rotatably mounted on an eccentric shaft 140. Upper and lower angle members 142 and 144 respectively, are welded or otherwise fixedly secured to plate 108 and are provided with aligned apertures which receive the reduced end portions of the shaft 140 so as to rotatably mount the assembly 136 on the plate member 108. Each reduced end portion of the shaft 140 is provided with a threaded portion which threadedly receives a nut and lock washer so that the shaft 140 can be fixedly positioned with respect to the members 142 and 144. The upper member 132 is further provided with a split collar assembly 146 which is fixedly secured thereto and fixes the position of the bracket assembly 136 with respect to the shaft 140. Members 132 and 134 are further provided with aligned apertures adjacent the free ends thereof which receive the partially threaded reduced end portions of an eccentric shaft 148. The lower end portion of the shaft 148 is rotatably supported by a shouldered bushing mounted in an apertured plate member 150 which is bolted to member 134. A nut and washer on the lower end portion of the shaft fixes the position of the shaft with respect to the member 150. The upper reduced end portion of the shaft 148 is rotatably supported by a shouldered bushing mounted in the member 132. The upper reduced end portion is generally of double D shape so as to be slidably and nonrotatably coupled to a crank arm 152 having one end thereof provided with a like shaped opening. The arm 152 is secured in place on the shaft 148 by a nut and lock washer assembly. The pulley 124 is of solid construction, although it may be otherwise, and is rotatably supported on the shaft 148 by suitable thrust bearings 154.

As best shown in FIGURE 4, a clevis 156 has its legs pivoted at 158 to the arm 152. A threaded shaft 160 extends between the clevis 156 and a clevis 162 having its legs pivoted at 164 to an arm 166 fixedly secured to the member 132. A coil compression spring 168 surrounds the shaft 160 and has one end thereof seating on an annular flange 170 of clevis 156 and the other end thereof seating on a conical member 172 which is slidably mounted on shaft 160 and is held in place by a pair of lock nuts 174. It will be noted that the axis of the pivots 158 and 164 is parallel to a line through the centers of the shafts 148 and 140. A plate member 176 extends between the shorter legs of the members 132 and 134 and receives a positioning bolt 178 therethrough. The inner end of the bolt engages the plate member 108 and the bolt is located by lock nuts 180 which engage opposite sides of the member 176. Members 132 and 134 are further interconnected by a spacing sleeve which is located in place by a bolt 184.

The support assemblies 136 of unit 102 are mounted on the frame 104 of this unit in the same manner as the assemblies 136 of the unit 100. The pulleys 124 of the unit 102 are rotatably mounted on the members 132 and 134 by shafts 186, which are essentially the same as shafts 148 but are noneccentric. Further, the shafts 186 have their upper ends bolted to the members 132 rather than being secured to any crank arms 152.

The positioning pulleys 122 of both units are rotatably mounted on shafts 188, similar to shafts 148 but noneccentric, with the upper and lower threaded end portions of the shafts 188 being received within slots 190 of upper and lower spaced channel-shaped members 192 which are secured to the plates 108. The reduced end portions of the shafts are bolted to the members 192 and the pulleys 122 may be adjusted normally with respect to the plates 108 within the slots 190 of the members 192.

The pulleys 126 are rotatably mounted on shafts 194 which are similar to shafts 148 but non-eccentric, with the upper and lower ends of the shaft being received through and bolted to upper and lower members 196 and 198, respectively, of a support assembly 200. These members are interconnected by a web 202 and a sleeve 204. A shaft 206, similar to the shaft 148 but non-eccentric, extends through the sleeve 204 and has its upper and lower ends bolted to the members 196 and 198 to rotatably mount assembly 200 on members 142 and 144. Set screws 208 engage opposite sides of the web 202 to fix the position of the assembly 200 about the axis of the shaft 206. Each set screw is adjustably mounted in a bracket 210 fixed to the plate 108.

The driver belts 120 engage the driven belt segments 84 to each side thereof with an equal driving force to prevent slack and binding in the system. In the specific embodiment shown, each spring 168 exerts a force of approximately 25 pounds on the crank arm 152 and with a mechanical advantage of eleven to one, the radial force applied to each driven belt segment 120 at its line of tangency to a pulley 124 is approximately 275 pounds. Since this force is applied by the spring biased pulleys 124, the non-spring biased pulleys 124 on the other side of the driven belt segments 84 will exert an opposing force which is equal and opposite in direction.

The positioning pulleys 122 are adjusted with respect to the belts 120 to position the belts immediately adjacent the belt segments 84, and to also partially tension the belts. The tensioning pulleys 126 are adjusted to take up all of the slack in each of the driving belts. The pulleys 124 of the unit 102 are adjusted by loosening the collars 146 and the nuts which fix shafts 140 to members 142 and 144, and then placing a wrench on one of the flatted end portions of the shaft 140 to rotate the shaft until the pulleys 124 cause the driver belts 120 to engage the belt segments with the desired force. Thereafter, the collars 146 are tightened to fix the position of each assembly 136 with respect to its shaft 140 and the bolts 178 are also positioned with respect to the plate 108 to maintain the angular position of assembly 136.

The pulleys 124 of the unit 100 are similarly adjusted except that a final adjustment is made by positioning the member 172 on the shaft 160 to adjust the amount of compression which the spring 168 exerts on the crank arm 152. Various final adjustments may have to be made in the positioning pulleys 122 and the tensioning pulleys 126 after each of the assemblies 136 is adjusted.

It will be noted that a line through the center of a respective pair of shafts 140 and 148 or 140 and 186 is located approximately 15° with respect to the belt segment 84. It has been found that this angular relationship should preferably not be greater than 15° and that best results may be obtained when the line through the centers of the shafts of the units 136 approaches a normal relationship with the belt segments 84.

Although a particular manner of mounting the driving pulleys 124 and the positioning and adjusted pulleys 122 and 126 respectively, has been shown and described, other manners of mounting these pulleys may be used with equal success as long as the angle of force and the force which the belt 120 exerts on the belt segments 84 may be adjusted and also as long as the angular relationship between the mounting means and the belt segment may be adjusted.

Intermediate each pair of opposed mounting bases 104, the conveyor system is cross-braced by a lower generally U-shaped cross brace 212 which extends between the beams 10 and 12, a pair of vertical cross braces 214 having their lower ends welded to the brace 212 and their upper ends welded to a block member 216 which is secured to a respective plate 15 and 16, with each vertical brace 214 supporting an extending bracket 218 which is bolted to a respective member 22 and 24 to support and locate these members. Other cross bracing may be provided if necessary or desirable. A vertically extending longitudinal T brace 222 extends between each pair of blocks 216 and each pair of braces 214, and the members 18 and 20 further reinforced by blocks or plates 224 which extend between these members and a respective plate 15 and 16.

From the foregoing description, it will be noted that this invention provides an improved conveyor system wherein the belts 120 both exert compression upon and transfer their motion to the belt segments to move the belt segments along the conveyor system at a predetermined rate. While all of the belts 120 are driven at the same speed, regardless of whether these belts are located on a linear or curvilinear part of the conveyor system, the tension and the position of the belts 120 will differ depending on the location of the belts.

Thus, this invention provides a new and improved conveyor system of the friction drive type.

What is claimed is:

1. A conveyor system comprising, in combination, guiding means defining a predetermined path of travel and including curved guiding portions, movable means guided by said guiding means, thin flat flexible drive belt means, means connecting an edge portion of said belt means to said guided means to transmit driving forces from said belt means to said guided means, and driving means for compressively gripping said belt means and applying driving forces thereto to drive said guided means, said belt means being adapted to flex and curve with said guided means in said curved guiding portions, said driving means being adapted to compressively grip and drive said belt means when said belt means are curved in said curved guiding portions.

2. A conveyor system comprising, in combination, guiding means defining a predetermined path of travel and including helix-like curved guiding portions, movable means guided by said guiding means, thin flat flexible drive belt means adapted to extend from said guided means, means connecting an edge portion of said belt means to said guided means to transmit driving forces applied to a face of said belt means to said guided means, and driving means arranged in spaced relation with said guided means for compressively gripping said belt means and applying driving forces to said face thereof, said belt means being adapted to flex and helically convolute with said guided means in said helix-like guiding portions, said driving means being adapted to compressively grip and drive said belt means when said belt means is convoluted in said helix-like guiding portions.

3. A conveyor system comprising, in combination, guiding means defining a predetermined path of travel and including helix-like curved guiding portions, an articulated series of movable driven members trained within said guiding means and being adapted to helically convolute within said guiding portions, a series of thin flat flexible belt segments adapted to be suspended from said trained members, means operatively securing an edge portion of each of said segments to said trained members to transmit driving forces applied to said segments to said trained members, driving belt means arranged below said trained members for successively compressively gripping and driving opposite faces of said segments, said segments being adapted to flex and helically convolute with said trained members in said guiding portions, and means for causing said drive belts to successively compressively grip and drive said faces of said segments when said segments are flexed and convoluted in said guiding portions.

4. A conveyor system comprising, in combination, guiding means defining a predetermined path of travel and including helix-like curved guiding portions, an articulated series of bogie assemblies trained within said guiding means and being adapted to helically convolute within said guiding portions, a series of thin flat driven belt segments adapted to be suspended from said series of bogie assemblies, means operatively securing an edge portion of each of said segments to a respective bogie assembly to transmit driving forces applied to said segments to said bogie assemblies, a pair of opposite endless drive belts arranged below said guiding means for successively and compressively engaging and driving opposite flat faces of each of said segments therebetween, driving pulley means for driving said drive belts oppositely with respect to each other, driven pulley means respective to and driven by said drive belts, said segments being adapted to flex and helically convolute with said bogie assemblies in said guiding portions, and means for adjusting said driven pulley means to cause successive compressive and driving engagement of said drive belts with said faces of said segments when said segments are helically convoluted in said guiding portions.

References Cited by the Examiner

UNITED STATES PATENTS

| | | | |
|---|---|---|---|
| 2,372,646 | 4/45 | Barnby | 198—165 |
| 2,386,558 | 10/45 | Kleintop | 198—203 |
| 2,508,216 | 5/50 | Bonds | 198—165 |
| 2,630,206 | 3/53 | Fergnani | 198—165 |
| 2,759,595 | 8/56 | Lauenstein | 198—203 |
| 2,787,366 | 4/57 | Sykokis | 198—137 |
| 2,863,555 | 12/58 | Jaritz | 198—203 |
| 2,933,178 | 4/60 | Hammond | 198—177 |

SAMUEL F. COLEMAN, *Primary Examiner.*

WILLIAM B. LA BORDE, ERNEST A. FALLER,
*Examiners.*